3,839,349
CERTAIN BENZOTHIAZOLONES AND
SYNTHESIS
Klaus Wagner and Ingeborg Hammann, Cologne, and Gunter Unterstenhofer, Opladen, Germany, assignors to Bayer Aktiengesellschaft, Leverkusen, Germany
No Drawing. Filed Jan. 4, 1972, Ser. No. 215,436
Claims priority, application Germany, Jan. 12, 1971,
P 21 01 150.7
Int. Cl. C07d 91/44
U.S. Cl. 260—304          9 Claims

ABSTRACT OF THE DISCLOSURE

Benzthiazolones of the general formula

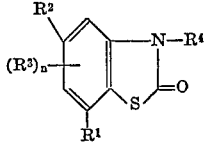
(1)

in which
$R^1$ is an electronegative radical,
$R^2$ is hydrogen, alkyl or an electronegative radical,
$R^3$ is hydroxy, alkoxy or an aliphatic or cycloaliphatic radical,
$R^4$ is a radical of the formula

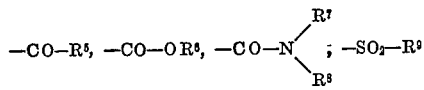

or hydrogen,
$R^5$ is hydrogen, alkyl, substituted alkyl, alkenyl, phenyl or substituted phenyl,
$R^6$ is alkyl or phenyl,
$R^7$ is hydrogen, alkyl, alkoxyalkyl, alkenyl or other aliphatic radical, phenylalkyl, phenyl or substituted phenyl,
$R^8$ is alkyl, alkenyl, or except when $R^7$ is hydrogen, hydrogen, or
$R^7$ and $R^8$ together with the nitrogen to which they are attached form a heterocyclic ring,
$R^9$ is alkyl, substituted alkyl, phenyl, substituted phenyl or dimethylamino, and
$n$ is 0, 1 or 2, which possess insecticidal, acaricidal, fungicidal, algicidal and herbicidal properties.

---

The present invention relates to and has for its objects the provision of particular new benzthiazolones, wherein an electronegative radical is present in the 7-position and a hydrogen, carbonyl or sulfonyl radical is directly connected to the nitrogen atom, which possess insecticidal, acaricidal, fungicidal, algicidal and herbicidal properties, active compositions in the form of mixtures of such compounds with solid and liquid dispersible carrier vehicles, and methods for producing such compounds and for using such compounds in a new way especially for combating pests, e.g. insects, acarids, fungi, algae and undesired plants, especially insects, acarids and fungi, with other and further objects becoming apparent from a study of the within specification and accompanying examples.

The present invention provides, as new compounds, benzthiazolones of the general formula

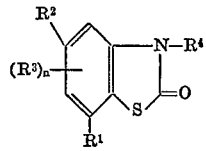

in which
$R^1$ is an electronegative radical,
$R^2$ is hydrogen, alkyl or an electronegative radical,
$R^3$ is hydroxy, alkoxy or an aliphatic or cycloaliphatic radical,
$R^4$ is a radical of the formula

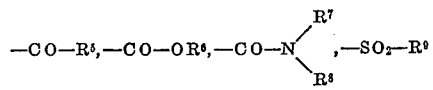

or hydrogen,
$R^5$ is hydrogen, alkyl, substituted alkyl, alkenyl, phenyl or substituted phenyl,
$R^6$ is alkyl or phenyl,
$R^7$ is hydrogen, alkyl, alkoxyalkyl, alkenyl or other aliphatic radical, phenyl or substituted phenyl,
$R^8$ is alkyl, alkenyl, or except when $R^7$ is hydrogen, hydrogen, or
$R^7$ and $R^8$ together with the nitrogen to which they are attached form a heterocyclic ring,
$R^9$ is alkyl, substituted alkyl, phenyl, substituted phenyl or dimethylamino, and
$n$ is 0, 1 or 2.

These compounds possess strong acaricidal, insecticidal and fungitoxic properties.

Preferred electronegative radicals $R^1$ are nitro, trifluoromethyl, trifluoromethoxy, chlorine, bromine, iodine and radicals of the formula $—SO_2Y$, in which Y is an aliphatic, cycloaliphatic, araliphatic or aromatic radical, fluorine or an optionally substituted amino group.

Aliphatic radicals Y are generally those with 1 to 8, preferably lower aliphatic with 1 to 4, carbon atoms, which radicals may be branched. Of the cycloaliphatic radicals, those with 5 or 6 carbon atoms in the ring system are preferred.

Araliphatic radicals Y contain in the aliphatic chain generally 1 to 4, preferably 1 or 2, carbon atoms and, as the aromatic moiety, preferably the phenyl radical.

As the aromatic radical Y, the phenyl radical is preferred.

If Y stands for an amino group, one or both hydrogen atoms may be replaced by a $C_{1-4}$ lower alkyl group or by a 5- or 6-membered cycloaliphatic radical, or the nitrogen atom may be part of a preferably 5- or 6-membered heterocyclic ring which may also contain an oxygen atom, a sulfur atom or a nitrogen atom that may carry a $C_{1-4}$ lower alkyl group. Furthermore, one of the hydrogen atoms of the amino group Y may also be replaced by a phenyl radical.

Alkyl radicals $R^2$ are preferably lower alkyl with 1 to 4 carbon atoms.

As electronegative radicals $R^2$, those mentioned under $R^1$ are suitable, as well as fluorine, cyano, formyl, or carboxyl, the last-mentioned possibly being esterified with an aliphatic or araliphatic alcohol or with a phenol.

When $R^2$ is esterified carboxy, the preferred esterifying radicals are those stated as preferred for the aliphatic, araliphatic or aromatic radicals Y.

The aliphatic radicals $R^3$ are preferably those with 1 to 8, especially 1 to 4, carbon atoms; cycloaliphatic radicals $R^3$ are preferably those with 5 or 6 carbon atoms in the ring system. Alkoxy groups $R^3$ are preferably lower alkoxy containing 1 to 4 carbon atoms.

$R^5$ is preferably hydrogen, alkyl with 1 to 12 carbon atoms optionally substituted by chlorine, bromine or trifluoromethyl, lower alkenyl with 2 to 4 carbon atoms or phenyl optionally carrying at least one chlorine, bromine, trifluoromethyl, nitro or methyl radical.

$R^6$ is preferably alkyl with 1 to 6 carbon atoms or phenyl.

$R^7$ is preferably hydrogen, alkyl with 1 to 12 carbon atoms, lower alkoxy-lower alkyl with 1 to 4 carbon atoms in each alkyl radical, lower alkenyl with 2 to 4 carbon atoms, phenyl, benzyl or phenylethyl with the benzene ring optionally carrying at least one chlorine, bromine, trifluoromethyl or methyl radical.

$R^8$ is preferably hydrogen, alkyl with 1 to 12 carbon atoms, or lower alkenyl with 2 to 4 carbon atoms. However, $R^7$ and $R^8$, together with the attached nitrogen atom, may form a 5- or 6-membered ring, preferably piperidine, pyrrolidine, morpholine or thiomorpholine.

$R^9$ is preferably lower alkyl with 1 to 4 carbon atoms optionally substituted by chlorine, bromine or trifluoromethyl, phenyl optionally substituted by at least one chlorine, bromine, trifluoromethyl, nitro or methyl, or a dimethylamino group.

The present invention also provides a process for the preparation of a substituted benzthiazolone of the formula (I) in which one of the particularly new benzthiozolones of the general formula

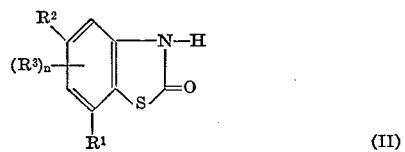

(II)

is reacted (a) with an acid chloride of the general formula $$R^5\text{—CO—Cl} \quad (III)$$

(b) with a chloroformic acid alkyl ester or chloroformic acid phenyl ester of the general formula $$R^6O\text{—CO—Cl} \quad (IV)$$

or (c) with a sulfonyl chloride of the general formula $$R^9\text{—SO}_2\text{—Cl} \quad (V)$$

or (d) in which a 2-carbamyl-benzthiazole-N-oxide-3 of the formula

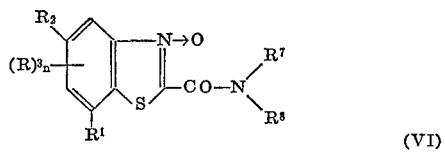

(VI)

is reacted with phosphorus oxychloride; in which formulas (II) to (VI), $R^1$, $R^2$, $R^3$, $R^5$, $R^6$, $R^7$, $R^8$, $R^9$ and $n$ possess the meanings stated above.

The benzthiazolones of the general formula (I), in comparison with known commercial products of the same directions of activity, possess a higher acaricidal, insecticidal and fungitoxic activity. The active compounds therefore represent a genuine enrichment of the art.

If, according to process variant (a), 5-trifluoromethyl-7-nitro-benzthiazolone and methacrylic acid chloride, for example, are used as starting materials, the reaction course can be represented by the following equation:

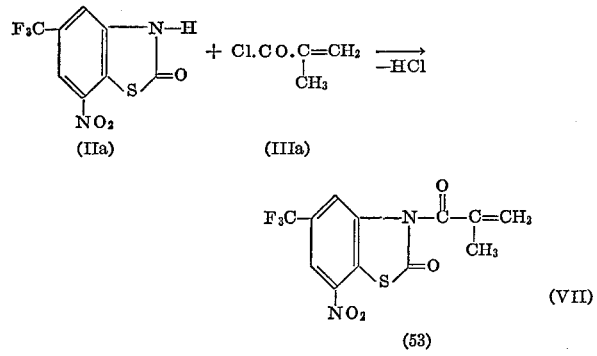

Similarly, process variant (b) may be illustrated by the following equation:

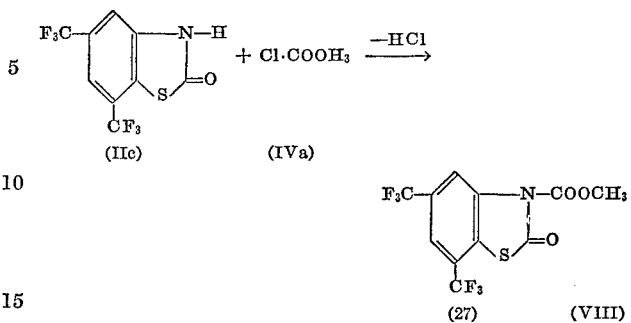

If, according to process variant (c), 5-nitro-7-trifluoromethyl-benzthiazolone and methanesulfochloride are used as starting materials, the reaction course is illustrated by the following equation:

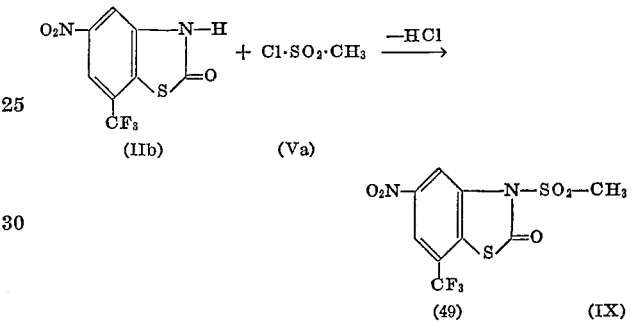

An example of the process variant (d) is the reaction of 2 - n - butylcarbamyl-5-trifluoromethyl-7-nitro-benzthiazole-N-oxide-3 with phosphorus oxychloride, which proceeds as follows:

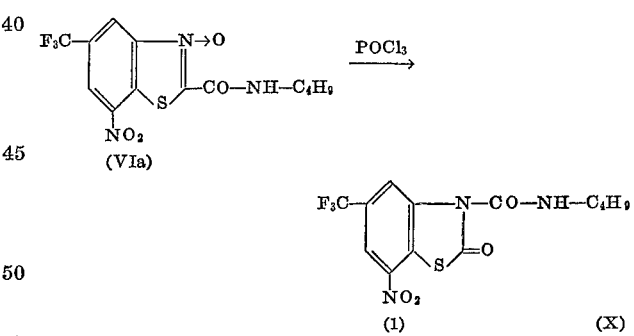

The benzthiazolones of the formula (II) required as starting materials are new. They can be prepared according to a process that has not been hitherto described in the prior art, from the suitably substituted 2-carbamyl-benzthiazole-N-oxides-3 by contact with phosphorus oxychloride at temperatures between about 20° and 160° C., preferably from about 50° to 110° C., according to the following equation:

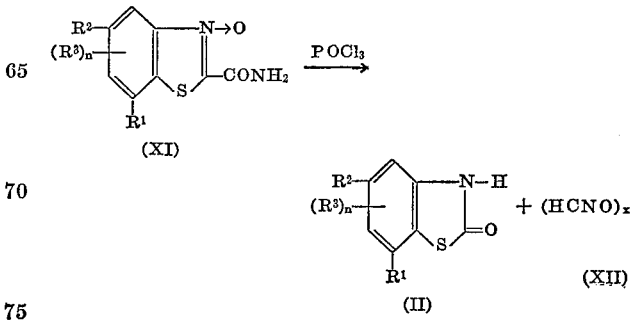

As examples of the benzthiazolones of the formula (II), there may be mentioned 5-trifluoromethyl-7-nitro-, 5 - nitro-7-trifluoromethyl- and 5,7-bis(trifluoromethyl)-benzthiazolones.

The acid chlorides of the formula (III) to be used as starting materials have been described in the literature. As examples, there may be mentioned: acetyl, trifluoroacetyl, propionyl, α-chloropropionyl, n-butyryl, acrylic acid, methacrylic acid, dimethylacrylic acid, crotonyl, p-chlorobenzoyl, o-nitro-benzoyl and toluyl chlorides.

The chloroformic acid esters of the formula (IV) are likewise already known. As examples, there may be mentioned: chloroformic acid isopropyl, methyl, ethyl, n-butyl, n-hexyl and phenyl esters.

The compounds (V) to be used as starting materials are also known from the literature. There may be mentioned, for example: methane-, chloromethane- and β-chloroethanesulfonyl chlorides, and benzene-, 3,4-dichlorobenzene- and 2-chlorobenzene-sulfochlorides.

As solvents and diluents predominantly suitable for the process variants (a) to (c) are inert organic solvents. These include hydrocarbons, such as benzene, chlorobenzene, toluene, and xylene; ethers, such as diethyl ether, dibutyl ether, tetrahydrofurane and dioxane; esters, such as ethyl acetate; ketones, for example acetone and methylethyl ketone; and nitriles, such as acetonitrile and propionitrile.

The process variants (a) to (c) are usually so carried out that the benzthiazolone concerned of the general formula (II) is provided in one of the said solvents in the presence of an acid-binding agent, preferably a tertiary amine, such as triethylamine, N,N-dimethylbenzylamine, diethylaniline, pyridine, picoline or quinoline, or an alkaline-reacting inorganic substance such as potassium or sodium carbonate, and the appropriate reactive chlorine compound of the formula (III), (IV) or (V) is added incrementally to the reaction mixture, with stirring.

The starting materials are preferably used in stoichiometric proportions.

The reaction temperature can be varied within a fairly wide range. In general, the work is carried out at from about —10° to +80° C., preferably at from about 10° to 40° C.

The working up of the reaction mixture may be carried out according to customary methods.

The purification of the reaction products can, if desired, be effected by recrystallization from organic solvents, especially from alcohols such as methanol or ethanol.

As already mentioned, the compounds according to the invention are distinguished by outstanding acaricidal, insecticidal and fungitoxic properties. They possess a good effectiveness against both sucking and biting insects, *Diptra* and mites, including a marked ovicidal and systemic activity. In addition, they are algicidally, and in higher applied amounts herbicidally, effective. They also exhibit anti-bacterial activity.

By reason of these properties, the new products may be used with success in crop protection against the most diverse animal pests as well as for the control of seed-borne and soil-borne fungal diseases of plants.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceaum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea or Rhyparobia maderae*), oriental cockroach (*Blatta orientlis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acari*) contemplated herein there are classed, in particular, the spider mites (*Tetranychidae*) such as the two-spotted spider mite (*Tetranychus telarius=Tetranychus althaeae or Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluents carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions) chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, rodenticides and fungicides, or bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process, it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, algae and undesired plants, and more particularly methods of combating at least one of the insects, acarids and fungi which comprise applying to at least one of correspondingly (a) such insects, (b) such acarids, (c) such fungi, (d) such algae, (e) such undesired plants and (f) the corresponding habitat thereof, i.e. the locust to be protected, a correspondingly combative or toxic amount, i.e. an insecticidally, acaricidally, fungicidally, algicidally or herbicidally effective amount of the particular active compound of the invention alone or together with a carrier vehicle as noted above. The instant formulations or compositions are applied in the usual manner, for instance by spraying atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The process of the present invention is illustrated in and by the following preparative Examples.

EXAMPLE 1

The unsubstituted benzthiazolones are prepared as follows:

(a)
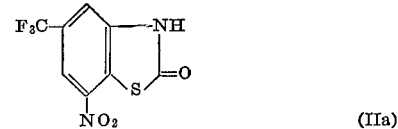
(IIa)

307 g. (1 mole) of 2-carbamyl-5-trifluromethyl-7-nitro-benzthiazole-n-oxide-3 are suspended in 300 cc. of anhydrous toluene. To this suspension there are slowly added dropwise at 90 to 100° C., with stirring, 153 g. (1 mole) of phosphorus oxychloride. The reaction mixture is stirred for a further 4 hours at 100 to 110° C. after completion of the dropwise addition, and the precipitated polycyanic acid is filtered off hot. During cooling of the filtrate, 216 g. (82% of theory) of 5-trifluoromethyl-7-nitro-benzthiazolone crystallize in the form of colorless needles. The product is filtered off with suction and washed with water until there is a neutral reaction. The compound has a melting point of 208 to 210° C.

Analysis.—$C_8H_3F_3N_2O_3S$ (molecular weight 264.5).

|  | C | H | F | N | O | S |
|---|---|---|---|---|---|---|
| Calc., percent | 36.4 | 1.2 | 21.6 | 10.6 | 18.2 | 12.1 |
| Found, percent | 36.6 | 1.3 | 21.3 | 10.7 | 17.6 | 12.0 |

(b) 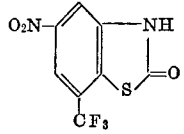 (IIb)

153.5 g. (0.5 mole) of 2-carbamyl-5-nitro-7-trifluoromethylbenzthiazole-N-oxide-3 are suspended in 700 cc. of anhydrous toluene and reacted, under the conditions stated in (a), with 76.5 g. (0.5 mole) of phosphorus oxychloride. After completion of the reaction and cooling of the mixture, the precipitated product is filtered off with suction and the residue on the filter is washed with water until there is a neutral reaction. For purification, the crystalline product obtained can be recrystallized from ethanol. 100 g. (76% of theory) of 5-nitro-7-trifluoromethyl-benzthiazolone are obtained in the form of colorless needles with a melting point of 247 to 248° C.

Analysis.—$C_8H_3F_3O_3S$ (molecular weight 264.5).

|  | C | H | F | N | O | S |
|---|---|---|---|---|---|---|
| Calc., percent | 36.4 | 1.2 | 21.6 | 10.6 | 18.2 | 12.1 |
| Found, percent | 36.6 | 1.5 | 22.3 | 10.7 | 17.8 | 11.7 |

(c) 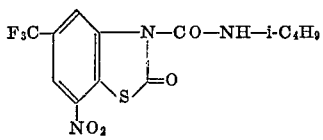 (IIc)

132 g. (0.4 mole) of 2-carbamyl-5,7 - bis - (trifluoromethyl)benzthiazole-N-oxide-3 are reacted in 400 cc. of toluene with 61.2 g. (0.4 mole) of phosphorus oxychloride under the same conditions as in (a). The precipitated polycyanic acid is filtered off hot and the solvent is removed under reduced pressure. The residue is washed with water until there is a neutral reaction and is then recrystallized from dilute ethanol 98 g. (86% of theory) of 5,7-bis-(trifluoromethyl)benzthiazolone are obtained in the form of shiny, almost colorless flakes of the melting point 138 to 139° C.

Analysis.—$C_9H_3F_6NOS$ (molecular weight 287.2).

|  | C | H | F | N | O | S |
|---|---|---|---|---|---|---|
| Calc., percent | 37.6 | 1.1 | 39.7 | 4.9 | 5.6 | 11.1 |
| Found, percent | 37.4 | 1.4 | 39.2 | 5.3 | 5.5 | 11.6 |

EXAMPLE 2

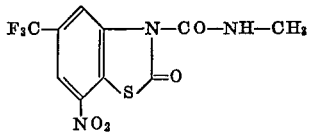 (1)

72.6 g. (0.2 mole) of 2 - isobutylcarbamyl-5-trifluoromethyl-7-nitro-benzthiazole-N-oxide-3 are dissolved in 400 cc. of anhydrous benzene and 30.6 g. (0.2 mole) of phosphorus oxychloride and the mixture is boiled for 3 hours under reflux. The solvent is then removed under reduced pressure, and the residue is recrystallized from ethanol. There are obtained 44 g. (60% of theory) of 3-N-(isobutylaminocarbonyl)-5-trifluoromethyl-7-nitro - benzthiazolone in the form of colorless needles of the melting point 104 to 105° C.

Analysis.—$C_{13}H_{12}F_3N_3O_4S$ (molecular weight 363.1).

|  | C | H | F | N | O | S |
|---|---|---|---|---|---|---|
| Calc., percent | 43.0 | 3.3 | 15.7 | 11.3 | 17.6 | 8.8 |
| Found, percent | 43.1 | 3.8 | 15.5 | 11.6 | 18.0 | 7.9 |

In an analogous manner to that described above, the following benzthiazolones were prepared from the corresponding 2-substituted-carbamyl-benzthiazole-N-oxides-3:

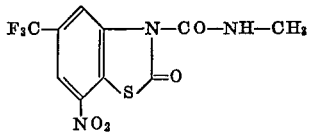 (2)

m.p.: 150° with decomposition

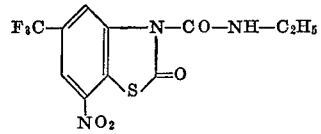 (3)

m.p.: 125° with decomposition

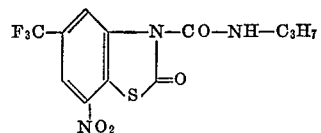 (4)

m.p.: 91-92° C. with decomposition

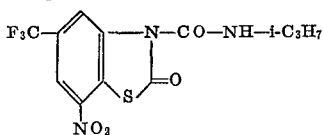 (5)

m.p.: 82-83° C. with decomposition

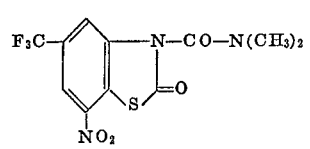 (6)

m.p.: 149-150° C.

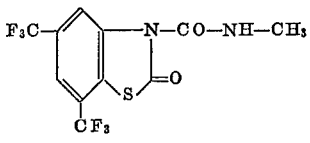 (7)

m.p.: 95-97° C.

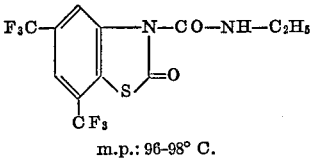 (8)

m.p.: 96-98° C.

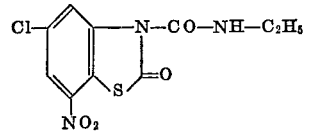 (9)

m.p.: 129-130° C.

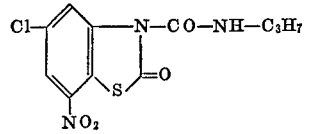 (10)

m.p.: 96-97° C.

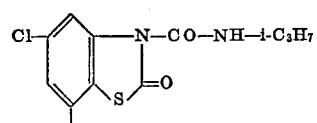 (11)

m.p.: 111-112° C.

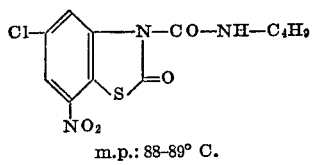

m.p.: 88–89° C.

(12)

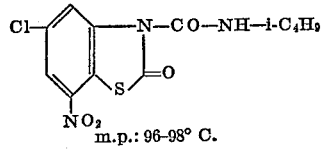

m.p.: 96–98° C.

(13)

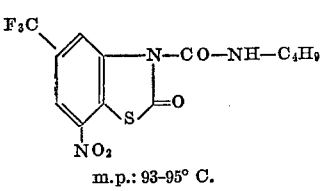

m.p.: 93–95° C.

(14)

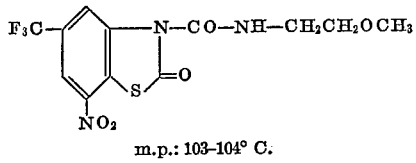

m.p.: 103–104° C.

(15)

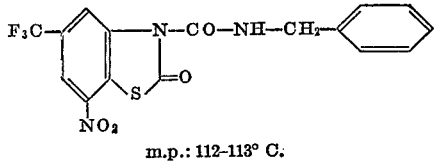

m.p.: 112–113° C.

(16)

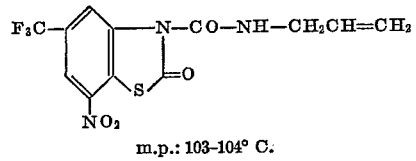

m.p.: 103–104° C.

(17)

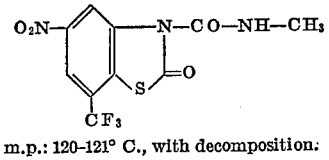

m.p.: 120–121° C., with decomposition.

(18)

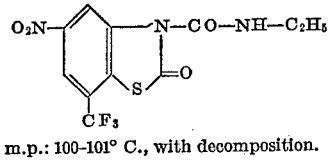

m.p.: 100–101° C., with decomposition.

(19)

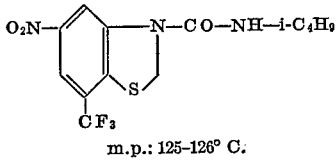

m.p.: 125–126° C.

(20)

EXAMPLE 3

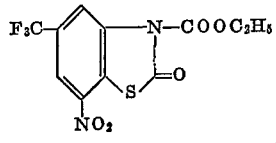

(21)

264 g. (1 mole) of 5-trifluoromethyl-7-nitro-benzthiazolone and 101 g. (1 mole) of triethylamine are dissolved in 1200 cc. of acetone. To this solution there are added dropwise at 20 to 40° C., with stirring, 108 g. (1 mole) of chloroformic acid ethyl ester. The reaction mixture is stirred for a further 3 hours at 20 to 30° C. and the mixture is then poured into ice water; the precipitated product is filtered off with suction and it is washed with water. After recrystallization from ethanol, 295 g. (88% of theory) of 3-N-(ethoxycarbonyl)-5-trifluoromethyl-7-nitro-benzthiazolone are obtained in the form of colorless needles of the melting point 100 to 101° C.

Analysis.—$C_{11}H_7F_3N_2O_5S$ (Molecular weight 336.1).

|  | C | H | F | N | O | S |
|---|---|---|---|---|---|---|
| Calc., percent | 39.4 | 2.1 | 17.0 | 8.3 | 23.8 | 9.5 |
| Found, percent | 39.4 | 1.8 | 17.2 | 8.3 | 23.5 | 9.4 |

In an analogous manner to that described above, the following new benzthiazolones are prepared from the corresponding benzthiazolones and chloroformic acid esters, carboxylic acid chlorides and sulfonic acid chlorides:

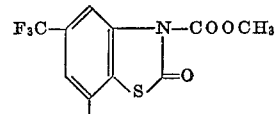

m.p. 137–138° C.

(22)

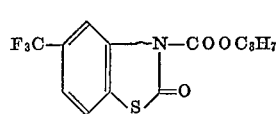

m.p.: 95–97° C.

(23)

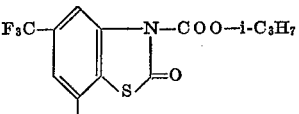

m.p.: 95–96° C.

(24)

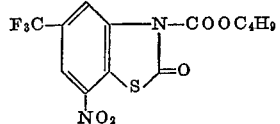

m.p.: 53–54° C.

(25)

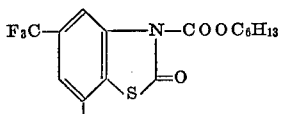

oil: $n_D^{20}=1.5218$ (26)

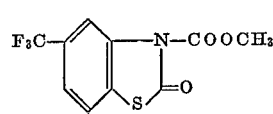

m.p.: 57–58° C.

(27)

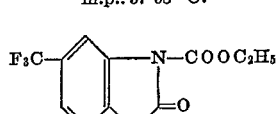
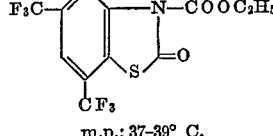

m.p.: 37–39° C.

(28)

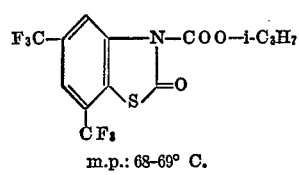
m.p.: 68–69° C. (29)
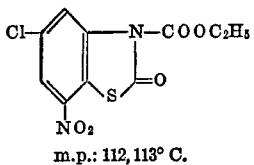
m.p.: 112, 113° C. (30)
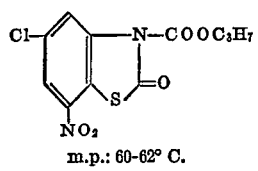
m.p.: 60–62° C. (31)
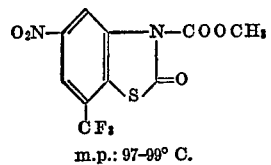
m.p.: 97–99° C. (32)
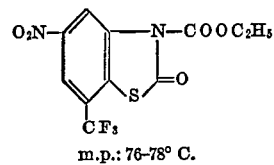
m.p.: 76–78° C. (33)
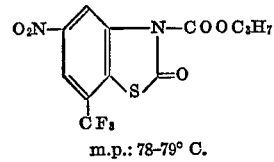
m.p.: 78–79° C. (34)
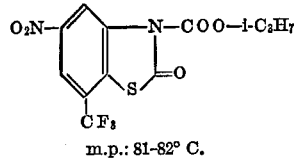
m.p.: 81–82° C. (35)
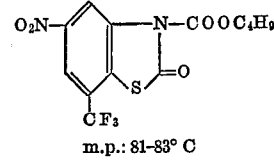
m.p.: 81–83° C (36)
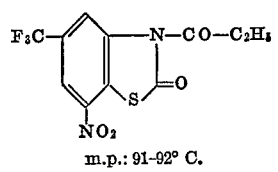
m.p.: 91–92° C. (37)
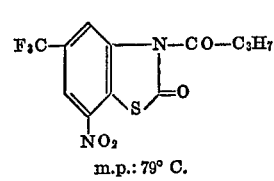
m.p.: 79° C. (38)
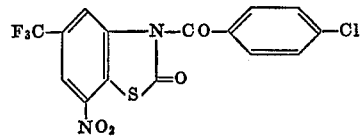
m.p.: 190° C. (39)
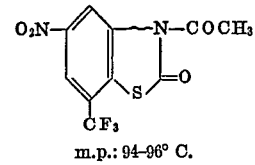
m.p.: 94–96° C. (40)
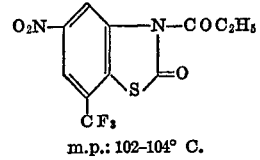
m.p.: 102–104° C. (41)
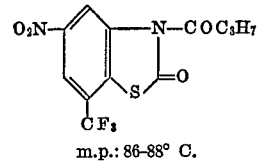
m.p.: 86–88° C. (42)
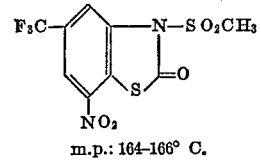
m.p.: 164–166° C. (43)
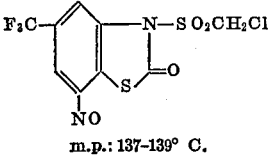
m.p.: 137–139° C. (44)
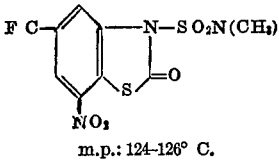
m.p.: 124–126° C. (45)
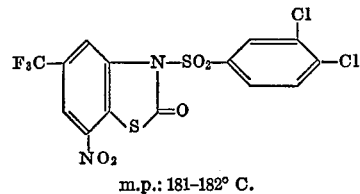
m.p.: 181–182° C. (46)
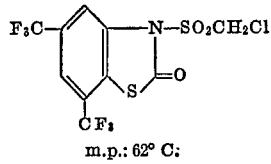
m.p.: 62° C. (47)
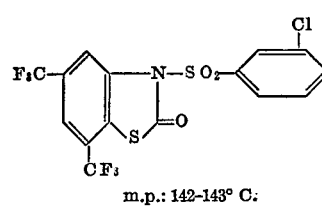
m.p.: 142–143° C. (48)

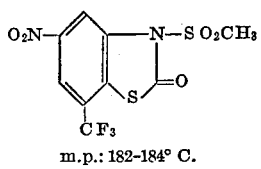

(49) m.p.: 182–184° C.

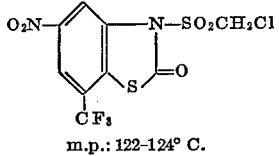

(50) m.p.: 122–124° C.

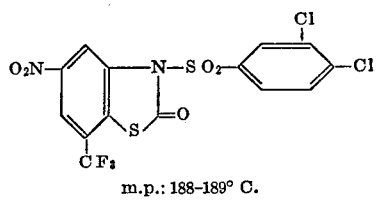

(51) m.p.: 188–189° C.

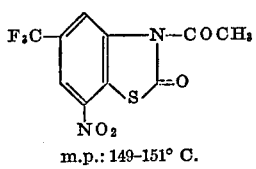

(52) m.p.: 149–151° C.

The pesticidal activity of the compounds of the invention is illustrated in and by the following test Examples.

EXAMPLE 4

Tetranychus test (*T. urticae*/phosphoric-acid-ester resistant)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 1:

TABLE 1
[*Tetranychus urticae* test]

| Active compound | Concentration of active compound in percent | Degree of destruction in percent after 2 days |
|---|---|---|
| (A) $(CH_3)_2N-CH=N-C_6H_3(CH_3)(Cl)$ (known) | 0.2 / 0.02 / 0.002 | 100 / 30 / 0 |
| (B) $(CH_3)_2N-CH=N-C_6H_4-O-C(=O)-NH-CH_3$ with S-CH_3 (known) | 0.2 / 0.02 | 95 / 0 |
| (41) $O_2N$-benzothiazolone-$N-COOC_2H_5$, $CF_3$ | 0.2 / 0.02 | 100 / 98 |
| (37) $F_3C$-benzothiazolone-$N-COOC_2H_5$, $NO_2$ | 0.2 / 0.02 | 100 / 100 |
| (38) $F_3C$-benzothiazolone-$N-COOC_3H_5$, $NO_2$ | 0.2 / 0.02 | 100 / 98 |
| (22) $F_3C$-benzothiazolone-$N-COOCH_3$, $NO_2$ | 0.2 / 0.02 | 100 / 95 |
| (33) $O_2N$-benzothiazolone-$N-COOC_2H_5$, $CF_3$ | 0.2 / 0.02 / 0.002 | 100 / 98 / 60 |
| (32) $O_2N$-benzothiazolone-$N-COOCH_3$, $CF_3$ | 0.2 / 0.02 | 100 / 100 |
| (21) $F_3C$-benzothiazolone-$N-COOC_2H_5$, $NO_2$ | 0.2 / 0.02 / 0.002 | 100 / 100 / 80 |
| (34) $F_3C$-benzothiazolone-$N-COOC_3H_7$, $CF_3$ | 0.2 / 0.02 / 0.002 / 0.002 | 100 / 95 / 60 / 60 |
| (23) $F_3C$-benzothiazolone-$N-COOC_3H_7$, $NO_2$ | 0.2 / 0.02 | 100 / 99 |
| (35) $O_2N$-benzothiazolone-$N-COO-i-C_3H_7$, $CF_3$ | 0.2 / 0.02 | 100 / 100 |

TABLE 1—Continued

[*Tetranychus urticae* test]

| Active compound | Concentration of active compound in percent | Degree of destruction in percent after 2 days |
|---|---|---|
| (24) F₃C—[benzisothiazole]—N—COO—i-C₃H₇, NO₂ | 0.2<br>0.02 | 100<br>100 |
| (29) F₃C—[benzisothiazole]—N—COO—i-C₃H₇, CF₃ | 0.2<br>0.02 | 100<br>80 |
| (25) F₃C—[benzisothiazole]—N—COOC₄H₉, NO₂ | 0.2<br>0.02<br>0.002 | 100<br>98<br>80 |
| (26) F₃C—[benzisothiazole]—N—COOC₆H₁₃, NO₂ | 0.2<br>0.02<br>0.002 | 100<br>98<br>70 |
| (3) F₃C—[benzisothiazole]—N—CO—NH—C₂H₅, NO₂ | 0.2<br>0.02 | 100<br>80 |
| (8) F₃C—[benzisothiazole]—N—CO—NH—C₂H₅, CF₃ | 0.2<br>0.02 | 100<br>90 |
| (14) F₃C—[benzisothiazole]—N—CO—NH—C₄H₉, NO₂ | 0.2<br>0.02 | 100<br>100 |
| (1) F₃C—[benzisothiazole]—N—CO—NH—i-C₄H₉, NO₂ | 0.2<br>0.02 | 100<br>50 |
| (47) F₃C—[benzisothiazole]—N—SO₂CH₂Cl, CF₃ | 0.2<br>0.02 | 100<br>100 |

EXAMPLE 5

Tetranychus test (*T. telarisu*/phosphoric-acid-ester resistant)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus telarius*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 2:

TABLE 2

[*T. telarius* test]

| Active compound | Concentration of active compound in percent | Degree of destruction in percent after 2 days |
|---|---|---|
| (A) (CH₃)₂N—CH=N—[C₆H₃(CH₃)]—Cl (known) | 0.02<br>0.004 | 90<br>0 |
| (32) O₂N—[benzisothiazole]—N—COOCH₃, CF₃ | 0.02<br>0.004 | 100<br>30 |
| (35) O₂N—[benzisothiazole]—N—COO—i-C₃H₇, CF₃ | 0.02<br>0.004 | 100<br>98 |

EXAMPLE 6

Plutella test

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 3:

TABLE 3
[Plutella test]

| Active compound | Concentration of active compound in percent | Degree of destruction in percent after 2 days |
|---|---|---|
| (B) $CH_3$-N(-CH=N-)(-CH_3)$ phenyl-O-C(=O)-NH-CH_3 (known) | 0.2<br>0.02 | 95<br>0 |
| $F_3C$-[benzothiazolinone]-N-H, $NO_2$ substituted | 0.2<br>0.02 | 100<br>100 |
| (7) $F_3C$-[benzothiazolinone]-N-CO-NH-CH_3, $CF_3$ substituted | 0.2<br>0.02 | 100<br>60 |
| (23) $F_3C$-[benzothiazolinone]-N-CO-OC_3H_7, $NO_2$ substituted | 0.2<br>0.02 | 100<br>90 |
| (43) $F_3C$-[benzothiazolinone]-N-SO_2CH_3, $NO_2$ substituted | 0.2<br>0.02 | 100<br>100 |

EXAMPLE 7

Doralis test (systemic action)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

The active compounds, the concentrations of the active compounds, the evaluation time and the results can be seen from the following Table 4:

TABLE 4
[Doralis test/systemic action]

| Active compound | Concentration of active compound in percent | Degree of destruction in percent after 4 days |
|---|---|---|
| (A) $CH_3$-N(-CH=N-)(-CH_3)$ phenyl with $CH_3$ and Cl substituents (known) | 0.2 | 0 |
| (B) $CH_3$-N(-CH=N-)(-CH_3)$ phenyl-O-C(=O)-NH-CH_3 (known) | 0.2 | 0 |
| (2) $F_3C$-[benzothiazolinone]-N-CO-NH-CH_3, $NO_2$ substituted | 0.2 | 100 |
| (16) $F_3C$-[benzothiazolinone]-N-CO-NH-CH_2-phenyl, $NO_2$ substituted | 0.2 | 100 |
| (8) $F_3C$-[benzothiazolinone]-N-CO-NH-C_2H_5, $CF_3$ substituted | 0.2 | 100 |

TABLE 4—Continued

| Active compound | Concentration of active compound in percent | Degree of destruction in percent after 4 days |
|---|---|---|
| (9) Cl—⟨benzothiazolone⟩—N—CO—NH—C₂H₅, NO₂ | 0.2 | 100 |
| (4) F₃C—⟨benzothiazolone⟩—N—CO—NH—C₃H₇, NO₂ | 0.2 | 100 |
| (11) Cl—⟨benzothiazolone⟩—N—CO—NH—i-C₃H₇, NO₂ | 0.2 | 100 |
| (5) F₃C—⟨benzothiazolone⟩—N—CO—NH—i-C₃H₇, NO₂ | 0.2 | 100 |
| (12) Cl—⟨benzothiazolone⟩—N—CO—NH—C₄H₉, NO₂ | 0.2 | 100 |
| (1) F₃C—⟨benzothiazolone⟩—N—CO—NH—i-C₄H₉, NO₂ | 0.2 | 100 |
| (13) Cl—⟨benzothiazolone⟩—N—CO—NH—i-C₄H₉, NO₂ | 0.2 | 100 |
| (15) F₃C—⟨benzothiazolone⟩—N—CO—NH—CH₂CH₂OCH₃, NO₂ | 0.2 | 100 |

It will be appreciated that the instant specification and examples are set forth by way of illustration and not limitation, and that various modifications and changes may be made without departing from the spirit and scope of the present invention.

What is claimed is:
1. A benzthiazolone of the formula

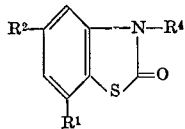

in which $R^1$ is nitro, trifluoromethyl, trifluoromethoxy, chlorine, bromine or iodine, $R^2$ is hydrogen, lower alkyl, nitro, trifluoromethyl, trifluoromethoxy, chlorine, bromine, iodine, fluorine, cyano, formyl, carboxyl or carbomethoxy, $R^4$ is a radical of the formula

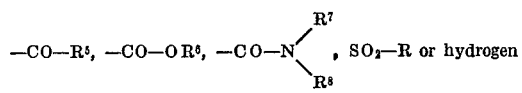

$R^5$ is hydrogen, alkyl with 1 to 12 carbon atoms optionally substituted by chlorine, bromine or trifluoromethyl, lower alkenyl, or phenyl optionally carrying at least one chlorine, bromine, trifluoromethyl, nitro or methyl radical, $R^6$ is alkyl with 1 to 6 carbon atoms or phenyl, $R^7$ is hydrogen, alkyl with 1 to 12 carbon atoms, lower alkoxy-lower alkyl, lower alkenyl, phenyl, benzyl or phenylethyl with the benzene ring optionally carrying at least one chlorine, bromine, trifluoromethyl or methyl radical, $R^8$ is alkyl with 1 to 12 carbon atoms or lower alkenyl, and $R^9$ is lower alkyl optionally substituted by chlorine, bromine or trifluoromethyl, phenyl optionally substituted by at least one chlorine, bromine, trifluoromethyl, nitro or methyl, or a dimethylamino group.

2. A benzthiazolone according to claim 1 in which $R^4$ is a radical of the formula —CO—$R^5$, —CO—$OR^6$,

—SO$_2$R$^9$ or hydrogen.

3. A benzthiazolone according to claim 1 in which $R^2$ is lower alkyl, nitro, trifluoromethyl, trifluoromethoxy, chlorine, bromine, iodine, fluorine, cyano, formyl, carboxyl, or carbomethoxy, and $R^6$ is alkyl with 1 to 6 carbon atoms.

4. The compound according to claim 1 wherein such compound is 3-N-(carbethoxy)-5-trifluoromethyl-7-nitrobenzthiazolone of the formula

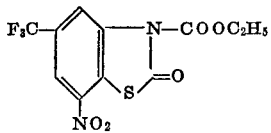

(21)

5. The compound according to claim 1 wherein such compound is 3 - N-(carbobutoxy)-5-trifluoromethyl-7-nitrobenzthiazole of the formula

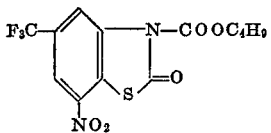

(25)

6. The compound according to claim 1 wherein such compound is 3 - N-(carbohexoxy)-5-trifluoromethyl-7-nitrobenzthiazolone of the formula

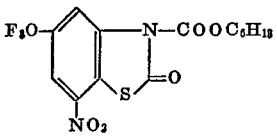

(26)

7. The compound according to claim 1 wherein such compound is 3 - N-(carbisopropoxy)-5-nitro-7-trifluoromethylbenzthiazolone of the formula

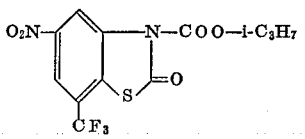

(35)

8. The compound according to claim 1 wherein such compound is 3-N-(methanesulfo)-5-trifluoromethyl-7-nitrobenzthiazolone of the formula

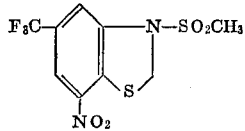

(43)

9. The process for preparing a benzthiazolone according to claim 1 wherein $R^4$ is

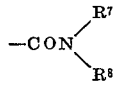

which comprises reacting phosphorus oxychloride at about 20 to 160° C. with a 2-carbamylbenzthiazole-N-oxide-3 of the formula

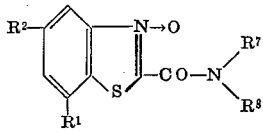

References Cited

UNITED STATES PATENTS

| | | | |
|---|---|---|---|
| 3,651,074 | 3/1972 | O'Amico | 260—304 |
| 3,661,921 | 5/1972 | Umio | 260—304 |

OTHER REFERENCES

Postovskll et al.; Chem. Abstracts, 49:1011 (1953).

RICHARD J. GALLAGHER, Primary Examiner

U.S. Cl. X.R.

71— 67, 90; 424—270

UNITED STATES PATENT OFFICE
CERTIFICATE OF CORRECTION

Patent No. 3,839,349      Dated October 1, 1974

Inventor(s) Klaus Wagner et al      (Page 1 of 2)

It is certified that error appears in the above-identified patent and that said Letters Patent are hereby corrected as shown below:

Col. 5, line 54, correct spelling of "Diptera".

Col. 9, line 41, after "ethanol" insert a period -- . --.

Col. 11, compound (20), cancel the structural formula and substitute

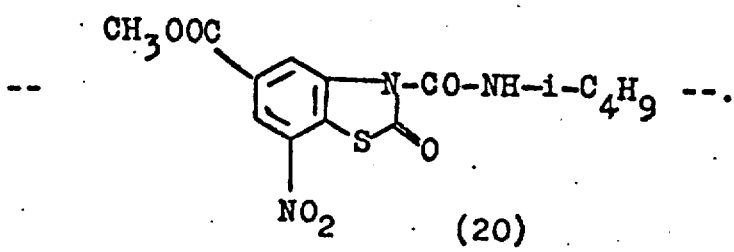

--     (20)     --.

Col. 12, line 16, "Found, percent", under heading "C" cancel "39.4" and substitute -- 39.5 --.

Col. 14, compound (45), in the structural formula, cancel "($CH_3$)" and substitute -- $(CH_3)_2$ --

Col. 16, compound (38), cancel "$H_5$" and substitute -- $H_7$ --.

Col. 16, compound (34), cancel "$F_3C$" and substitute -- $O_2N$ --.

Col. 16, line 60, after compound (34), cancel last line of figures reading "0.002      60".

FO-1050
(5/69)

UNITED STATES PATENT OFFICE
CERTIFICATE OF CORRECTION

Patent No. __3,839,349__  Dated __October 1, 1974__

Inventor(s) _____ (page 2 of 2) _____

It is certified that error appears in the above-identified patent and that said Letters Patent are hereby corrected as shown below:

Col. 21, compound (12), in the structural formula, cancel " $-C_4H^6$ " and substitute -- $-C_4H_9$ --.

Signed and sealed this 1st day of April 1975.

(SEAL)
Attest:

RUTH C. MASON
Attesting Officer

C. MARSHALL DANN
Commissioner of Patents
and Trademarks